United States Patent [19]

Eriksson

[11] 4,286,976
[45] Sep. 1, 1981

[54] COMBINED SOUND DAMPER AND OIL TRAP FOR A COMPRESSED AIR APPARATUS

[76] Inventor: Gunnar Eriksson, Högbyn, S-890 31, Arnäsvall, Sweden

[21] Appl. No.: 113,191

[22] Filed: Jan. 18, 1980

[30] Foreign Application Priority Data

Jan. 29, 1979 [SE] Sweden ............................... 7900735

[51] Int. Cl.³ ........................... B01D 50/00; F01N 3/02
[52] U.S. Cl. ........................................... 55/276; 55/319;
55/332; 55/392; 55/396; 55/DIG. 21; 55/DIG. 25; 181/222; 181/231; 181/258
[58] Field of Search ................. 55/186, 187, 192, 201, 55/276, 319, 332, 392, 418, DIG. 21, DIG. 25, 396; 181/211, 222, 230-232, 258

[56] References Cited
U.S. PATENT DOCUMENTS

| | | | |
|---|---|---|---|
| 2,521,785 | 9/1950 | Goodloe | 55/DIG. 25 |
| 2,639,779 | 5/1953 | Glanzer | 55/187 |
| 3,048,275 | 8/1962 | Headrick | 55/DIG. 25 |
| 3,688,868 | 9/1972 | Gibel | 55/276 |
| 3,720,046 | 3/1973 | Kudirka et al. | 55/418 |

FOREIGN PATENT DOCUMENTS 1064295  8/1959  Fed. Rep. of Germany ............. 55/396

Primary Examiner—David L. Lacey
Attorney, Agent, or Firm—Larson and Taylor

[57] ABSTRACT

A combined sound damper and oil trap for compressed air apparatus comprising an oil trap having a hose or tube (5) which is directly connected to the compressed air apparatus and which at the outer end thereof encloses a scraper sleeve (7), whereby a radial space is formed between the scraper sleeve (7) and the hose or tube. The hose or tube is connected to an oil collector housing (1) whereas the scraper sleeve (7) is connected to a pressure chamber (2) which in turn directly communicates with a filter housing (3) containing a sound damper. The said sound damper comprises both a diffusor plate (11) provided between the pressure chamber and the filter housing (3) and a filter (12) which is mounted at the outlet end of the filter housing. The diffusor plate (11) provides a damping of low frequency noise and a substantially even distribution of the outlet air over the entire diffusor plate, and the filter (12) provides both a separation of oil mist from the outlet air and a damping of high frequency noise.

8 Claims, 1 Drawing Figure

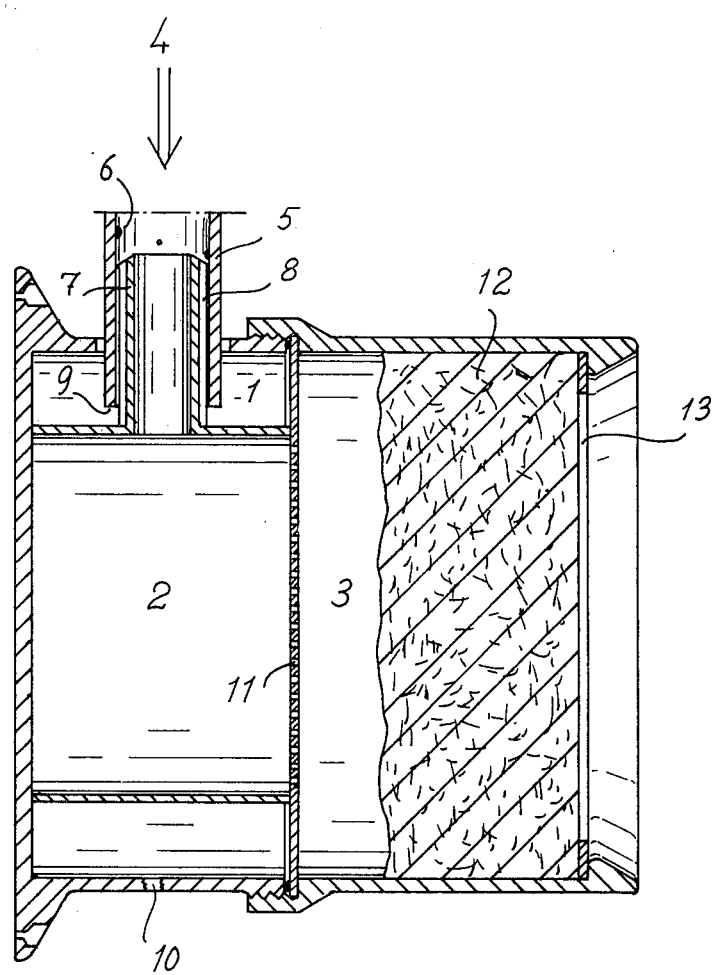

COMBINED SOUND DAMPER AND OIL TRAP FOR A COMPRESSED AIR APPARATUS

The present invention relates to an apparatus for damping noise from air outlets in connection with cleaning the air of lubrication oil.

Air cylinders which are commonly used within the industry are operated using valves which control the air flow to the pressure side of the cylinder piston at the same time as the opposite side of the piston is drained. When the cylinder moves, air flows from the draining side and out through the valve with great speed. Such outflow of air produces intense sound especially within the high frequency sound range. For people staying in the vicinity of the outlet the sound levels obviously are of such strength as to cause impaired hearing.

For operating reasons both the valve and the cylinder have to be lubricated using what generally is some type of mist lubrication apparatus which supplies a mist of oil to the compressed air. The oil mist follows the air through the valve and the cylinder and over the valve back into the room in which the valve is mounted. Apart from the practical disadvantages in a thick and dirty layer anywhere around the valve outlets there are medical health risks involved both in breathing and in coming into direct skin contact with the oil mist.

Therefore there is an obvious need both to damp the noise from the air outlets and to separate the oil from the air.

In the market there are both sheer dampers and combinations of oil separators/sound dampers. The first mentioned type is nearly without exception of the so called diffusor type wherein the air is allowed to pass a flow resistance means of for instance sintered metal or synthetic resin. The combination dampers are often designed so that the sound damping is based on the diffusor principle whereas the oil separation is based on cyclone or filter action. The sheer diffusor dampers are very disadvantageous in that the oil to a great extent is gasified when passing through the flow resistance means. Thereby the content of suspended oil mist is much greater than would be the case when no sound damper is used. The filter portion of the dampers/separators existing on the market is arranged as a pipe having porous walls. In such apparatus the air enters the filter through one end of the apparatus (the opposite end is sealed) and the air leaves through the porous pipe walls. In order to get a high filtering efficiency it is generally necessary that the flow is evenly distributed over the entire filter surface. For the above described apparatus it is thereby necessary that the counter pressure over the filter is very high. At low counter pressure the air hits the sealed filter end with high velocity and is not turned angularly until hitting said end. As a consequence thereof only a little portion of the filter surface is used and the velocity of the air passing said surface is so high that the apparatus provides a poor degree of oil separation. Operating demands on the damper restrict the possibilities of using a high counter pressure in that a high counter pressure results in operational disturbances in the system which can of course not be accepted.

The concept of available separators/dampers therefore presuppose a very difficult balancing between on one hand the demand of reasonable counter pressure and on the other hand a desire for an even distribution of the flow through the filter. It is indeed doubtful whether there actually exists a good point of balance between the said different properties. A suitable filter may perhaps be dimensioned for a predetermined air flow at a predetermined pressure, but since the separators operate at greatly varying flow amounts and pressures the working point will necessarily be far from optimum throughout their range of operation.

In addition to this disadvantage, there is also the disadvantage that a filter element designed for providing a suitable balancing between the above mentioned properties is complicated. Changing the filter which can be necessary after some months of operation may cost about 80% of the price of the entire apparatus. Since the said sound damper type has a high purchase price which is combined with a high maintenance cost this type of damper is not especially often used.

The object of the present invention is to provide an apparatus which gives the necessary sound damping and a high degree of oil separation and which operates at a low counter pressure and which is of such simple design that the cost of manufacturing the same is small.

The invention will now be described more in detail with reference to the attached drawing which shows a vertical cross-section through an apparatus according to the invention.

The combined sound damper and oil separator is intended for being connected directly to the outlet of a non-illustrated compressed air apparatus in order to provide both a separation of oil from the outlet air and to provide a damping of noise provided by the outlet air. The sound damper/oil separator basically comprises three main portions viz. an oil separator which is connected to the compressed air apparatus and which opens into a housing 1 for collecting separated oil, a pressure chamber 2 into which the main portion of the outlet air from the compressed air apparatus is introduced and a filter housing 3 which is connected to the pressure chamber 2 and which comprises a sound damper.

In the embodiment of the invention illustrated in the drawings the collector housing 1 is formed as an annular chamber surrounding the pressure chamber 2 and which is separated therefrom, whereas the pressure chamber 2 and the filter housing 3 are connected to each other. In the drawing the apparatus according to the invention is shown in a basically cylindric design, but for the operation it is also possible to design the apparatus in other forms like square, rectangular, polygonal etc.

The air 4 from the compressed air apparatus which contains a mist of oil is expelled pulse by pulse from the outlet valve of the compressed air apparatus and moves in a turbulent air flow and with high velocity in a hose or a tube in the direction of the arrow. The air generally has a starting pressure of 5-7 bars. When the air expands in the hose it is heavily cooled and the oil mist falls out or condenses on the available surfaces, viz. the inner surface of the hose or tube wall. Since the air flow is turbulent there is a high probability that the oil mist will fall out and hit the tube wall 5 or to condense thereon. The hose or the tube 5 which may have circular or any other cross-section form should have an area such that the air speed along the tube wall is not so high that the oil drops are not carried away by the air flow.

The oil drops 6 on the tube walls are forced by the air flow to move in the flow direction until they reach a scraper sleeve 7. The said scraper sleeve 7 is connected to the hose or tube 5 so as to provide one or more passage ways or channels between the sleeve 7 and the tube 5. The said channels may be provided by projecting portions 8 on the scraper sleeve or on the air hose 5. For the same purpose the hose or the sleeve may alternatively be formed with recesses or grooves. In one embodiment of the invention it is provided in that the outer contour of the scraper sleeve 7 has a polygonal cross-section or that the inner cross-section contour of the hose 5 is a polygon. The recesses or grooves are, in a preferred embodiment, simply oriented in the axial direction but it is alternatively possible to provide the grooves or recesses in any other geometric form like a spiral form.

The essential thing for the operation is that there is an open connection between the air hose 5 and the scraper sleeve 7.

As a variation a porous material may act as a spacer means between the scraper sleeve 7 and the hose 5 whereby the pores of the said material act as a large number of connection channels. By the described apparatus the capillary forces draws oil into the space (the channels) between the scraper sleeve and the hose wall. The pressure difference over the space, i.e. the difference between the dynamic pressure provided by the air flow and the atmospheric pressure existing outside the tube or hose i.e. in the oil collector housing 1 thereafter causes the oil to move towards the end 9 of the hose, from which the oil drops down in the collector housing.

The drops are collected in the housing 1 and flow to an outlet opening 10 in the wall of the housing. The said outlet opening preferably should be located at a low level when the damper/separator is mounted. For practical reasons it is therefore preferable that there are several openings in the housing one or more of which can be chosen. To the outlet opening 10 a non-illustrated container for collecting the oil is connected. Draining bores which are not used ought to be plugged.

The main part of the air flow enters the pressure chamber 2 and is further linked through a diffusor plate 11. The said plate 11 is perforated with such small holes that it acts as an acoustic filter which effectively blocks the low frequency noise. Consequently the low frequency noise does not pass the diffuser plate 11. The sound of the air which flows past the small holes of the plate is of a high frequency character. The said high frequency sound transmitted from the diffusor is thereafter effectively damped when passing through a filter 12.

The holes of the diffusor plate 11 must not be so small that they are blocked by possible impurities. Therefore the hole diameter should not be less than about 0.5 mm. Also the holes must not be so large as to provide a substantial sound generation at the lower frequencies, and therefore the diameters of the holes should not be more than about 3 mm. Preferably the hole diameter should be 1.5 mm.

The filter 12 is made of a fibrous material provided by a large number of thin threads or fibers. Glas or synthetic resin fibers have proved to be a suitable material. The placing of the filter in the air flow is such that the air passes without any change of angle which provides a very good air distribution and filter action effeciency even at strongly varying flows.

The oil cleaning effect of the filter is based on two different principles: on one hand the oil is absorbed and on the other hand microscopic particles are combined in a drop forming process (coalescing) providing larger drops. The said drops flow away at the outside of the filter and do not affect the oil content of the air.

If the compressed air contains extremely large amounts of impurities and the equipment is not adequately maintained (for instance, where there is neglect in changing the filter) there is in all filters a risk that they are blocked to such degree that the operation of the entire system is affected. In the present invention this risk is eliminated in that the filter is mounted so as to be supported only at the outlet edge. Since the support can be adapted (over the ring 13) to the stiffness of the filter the filter may simply cant out of the filter housing if the counter pressure is too high. This is a very suitable property.

For instance in connection with compressed air presses one cannot use dampers which involve the risk of blocking since a blocking of a damper may affect the operation of the press so that for instance a two-hand release is so strongly delayed that it has no longer any effect. Serious accidents therefor may occur.

To sum up the oil separation is accomplished as follows: The scraper sleeve 7 provides an oil trap which catches the substantial part of the oil and of water steam in the air. The filter 12 finally catches and makes drops of the remaining microscopical portions of the oil brought in with the air.

The noise damping effect is based on substantially two different components which coact with each other: the diffusor plate 11 which very effectively blocks low frequency noise and the subsequent oil filter 12 which dampens the high frequency noise.

It is obvious to the expert that the above described embodiment of the invention which is illustrated in the drawing is only an illustrative example and that all kinds of modifications may be effected within the scope of the appended claims.

I claim:

1. A combined sound damper and oil trap for compressed air apparatus, said sound damper and oil trap comprising:

an oil collector housing;
a pressure chamber;
a filter housing;
a hose or tube adapted to be connected to the outlet of the compressed air apparatus and opening into said oil collector housing;
a scraper sleeve having an outer diameter which is less than the inner diameter of the said hose or tube, one end of said scraper sleeve being mounted in said hose or tube substantially centrally thereof so as to provide a narrow axial free space between the tube or hose and the scraper sleeve, and the opposite end of the scraper sleeve opening into said pressure chamber;
said pressure chamber being mounted under sealed condition within the oil collector housing and being connected to and opening into said filter housing, said filter housing being filled with a sound damping filter material and opening into the ambient air;
whereby oil which condensed on the inner surface of the tube or hose is collected and together with a small amount of air flowing through the tube or hose is received in the oil collector housing whereas the main portion of the air flowing the tube or hose passes through the scaper sleeve and is received in the pressure chamber from which the air passes through the sound damping filter material in the filter housing and out into the ambient air.

2. Combined sound damper and oil trap according to claim 1, wherein the scraper sleeve is mounted centrally of said hose or tube by means of extensions between the hose or tube and the scraper sleeve.

3. Combined sound damper and oil trap according to claim 1, wherein the oil collector housing is separated from the pressure chamber, and wherein a portion of the oil collector housing is provided with an outlet opening for tapping off oil collected in said oil collector housing.

4. Combined sound damper and oil trap according to claim 1, wherein the pressure chamber is separated from the filter housing by a diffusor plate having a large number of small through holes so as to provide an even distribution of the flow of air between the pressure chamber and the filter housing over the entire surface of the diffusor plate and for damping low frequency noise from the outlet.

5. Combined sound damper and oil trap according to claim 4, wherein the diameters of said through holes lie between about 0.5 and 3.0 mm.

6. Combined sound damper and oil trap according to claim 1 wherein said filter material comprises material for providing conglomeration of oil particles into large oil drops which can be diverted from the filter material and for damping high frequency noise.

7. Combined sound damper and oil trap according to claim 6, wherein the filter material comprises a fibrous material formed by a large number of threads or fibers.

8. Combined sound damper and oil trap according to claim 6, wherein the filter material is supported and maintained in place in the filter housing by means of a narrow ring disposed at the outlet opening of the filter housing, the size of said ring being such that the majority of the filter material surface is left free so that the filter is automatically pressed out of the filter housing if the counter pressure thereon should be too high.

* * * * *